US010006762B2

(12) United States Patent
Furihata (10) Patent No.: US 10,006,762 B2
(45) Date of Patent: Jun. 26, 2018

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hisayoshi Furihata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 15/220,030

(22) Filed: Jul. 26, 2016

(65) Prior Publication Data

US 2017/0032530 A1 Feb. 2, 2017

(30) Foreign Application Priority Data

Jul. 30, 2015 (JP) .................................. 2015-150502

(51) Int. Cl.
| | |
|---|---|
| G06K 9/00 | (2006.01) |
| G01B 11/25 | (2006.01) |
| G06T 7/521 | (2017.01) |
| G06K 9/20 | (2006.01) |

(52) U.S. Cl.
CPC ........ *G01B 11/254* (2013.01); *G06K 9/00208* (2013.01); *G06K 9/2036* (2013.01); *G06T 7/521* (2017.01); *G06K 2209/401* (2013.01)

(58) Field of Classification Search
CPC ............... G01B 11/254; G06K 9/2036; G06K 9/00208; G06K 2209/401; G06T 7/521
See application file for complete search history.

(56) References Cited

U.S. PATENT DOCUMENTS

| | | | | |
|---|---|---|---|---|
| 6,999,623 | B1 * | 2/2006 | Yamaoka | G06K 9/4609 |
| | | | | 382/190 |
| 8,330,803 | B2 * | 12/2012 | Frey | G01B 11/25 |
| | | | | 345/419 |

(Continued)

OTHER PUBLICATIONS

Makoto Kimura et al., "Projector Calibration using Arbitrary Planes and Calibrated Camera", CVPR (Computer Vision and Pattern Recognition), 2007, two (2) pages.

(Continued)

*Primary Examiner* — John Strege
(74) *Attorney, Agent, or Firm* — Canon U.S.A., Inc. IP Division (57) ABSTRACT

To measure a three-dimensional shape of a measurement target object at high speeds, an information processing apparatus is configured to acquire an image captured while a pattern including first features and a second feature is projected onto the measurement target object; identify the first features in the captured image, and acquire an initial value of shape information on the measurement target object in an area including the first features; set a candidate for the shape information in a first area based on an initial value of shape information in an area surrounding the first area; decide an area in the pattern corresponding to the first area as a second area, and evaluate a correlation between the second area and the first area based on the second feature in the first area and the second feature in the second area; and derive the shape information in the first area.

16 Claims, 7 Drawing Sheets

(56) References Cited

U.S. PATENT DOCUMENTS

| | | | |
|---|---|---|---|
| 8,538,166 B2* | 9/2013 | Gordon | G01B 11/25 382/201 |
| 9,441,959 B2* | 9/2016 | Nagahashi | G01B 11/2504 |
| 9,727,775 B2* | 8/2017 | Ryu | G06K 9/00208 |
| 9,736,460 B2* | 8/2017 | Kanetake | H04N 13/0221 |
| 2007/0057946 A1* | 3/2007 | Albeck | G01B 11/2513 345/427 |
| 2007/0165243 A1* | 7/2007 | Kang | A43D 1/025 356/603 |
| 2008/0068379 A1* | 3/2008 | Larsen | G06K 9/0014 345/427 |
| 2009/0096783 A1* | 4/2009 | Shpunt | G01B 11/25 345/419 |
| 2010/0118123 A1 | 5/2010 | Freedman et al. | |
| 2010/0225746 A1* | 9/2010 | Shpunt | G01B 11/2518 348/50 |
| 2011/0050859 A1* | 3/2011 | Kimmel | G01B 11/2509 348/50 |
| 2011/0273443 A1* | 11/2011 | Ernst | G01B 11/25 345/419 |
| 2012/0105868 A1* | 5/2012 | Nomura | G01B 11/25 356/610 |
| 2012/0268567 A1* | 10/2012 | Nakazato | G01B 11/03 348/46 |
| 2012/0281087 A1* | 11/2012 | Kruse | G01B 11/25 348/136 |
| 2015/0279016 A1* | 10/2015 | Kim | H04N 13/0253 382/154 |
| 2017/0241767 A1* | 8/2017 | Miyata | G01B 11/002 |

OTHER PUBLICATIONS

Roger Y. Tsai, "A Versatile Camera Calibration Technique for High-Accuracy 3D Machine Vision Metrology Using Off-the-shelf TV Cameras and Lenses", IEEE Journal of Robotics and Automation, vol. RA-3, No. 4, 1987, pp. 323-344.

* cited by examiner

INFORMATION PROCESSING APPARATUS, INFORMATION PROCESSING METHOD, AND STORAGE MEDIUM

BACKGROUND OF THE INVENTION

Field of the Invention

The present disclosure generally relates to information processing and, more particularly, to an information processing apparatus, an information processing method, a storage medium, and a technique for measuring a three-dimensional shape of a measurement target object surface based on an image of the measurement target object captured with a pattern projected onto the target object.

Description of the Related Art

There is a conventional measurement method by projecting an illumination pattern including a design onto a target object and measuring a distance based on an image of the observed target object. According to this method, a correspondence between the image and the illumination pattern is calculated and the distance is determined on the principle of triangulation method. In the calculation of the correspondence, positions on the illumination pattern are changed to search for positions matching to positions on the image. In general, the search process takes time depending on the search area.

The specification of U.S. Patent Application Publication No. 2010/0118123 discloses a method using an illumination pattern with dots as design elements.

In the case of using the pattern described in the specification of U.S. Patent Application Publication No. 2010/0118123, it takes time to search for the correspondence between the image and the illumination pattern.

In view of these issues, aspects of the present disclosure allow high-speed measurement of a three-dimensional shape of an object.

SUMMARY OF THE INVENTION

According to an aspect of the present disclosure, an information processing apparatus includes: an acquisition unit that acquires an image captured by an imaging apparatus while pattern including a plurality of lines, identification information disposed on or between the lines for identification of the lines, and features disposed between the plurality of lines is projected onto a measurement target object; an initial value acquisition unit that associates the lines included in the projected pattern with the lines included in a captured image based on the identification information included in the captured image to identify the lines included in the captured image, and acquires an initial value of shape information on the measurement target object in an area including the lines in the captured image based on identified results.

A setting unit that sets a candidate for the shape information in a first area within the captured image based on the initial value of the shape information in an area surrounding the first area; an evaluation unit that decides an area in the pattern corresponding to the first area as a second area based on the candidate for the shape information in the first area, and evaluates a correlation between the second area in the pattern corresponding to the first area and the first area based on the features included in the first area and the features included in the second area; and a derivation unit that derives the shape information for the first area based on the correlation evaluated by the evaluation unit.

According to the present disclosure, it is possible to measure the three-dimensional shape of an object at high speeds.

Further features of the present disclosure will become apparent from the following description of exemplary embodiments (with reference to the attached drawings).

DESCRIPTION OF THE EMBODIMENTS

Various exemplary embodiments of the present disclosure will be described in detail below with reference to the attached drawings.

Prior to description of embodiments according to the present disclosure, a hardware configuration of an information processing apparatus in each of the embodiments will be explained with reference to FIG. 7.

Figure 7:
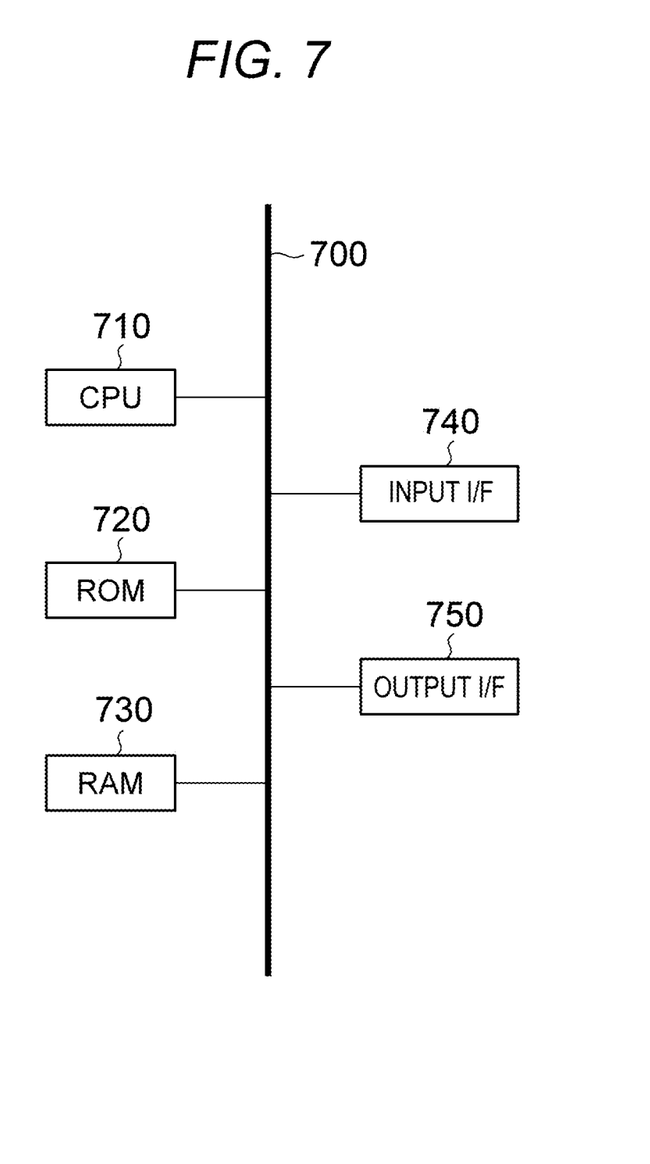
FIG. 7 is a diagram illustrating a hardware configuration of an information processing apparatus of the present disclosure.

FIG. 7 is a diagram of a hardware configuration of an information apparatus in each of the embodiments. Referring to FIG. 7, a central processing unit (CPU) 710, which may include one or more processors and one or more memories, performs a centralized control of devices connected together via a bus 700. The CPU 710 reads processing steps and programs from a read-only memory (ROM) 720 and executes the same. An operating system (OS), processing programs, device drivers, and others according to each of the embodiments are stored in the ROM 720, and are temporarily stored in a random access memory (RAM) 730 and are executed as appropriate by the CPU 710. An input I/F 740 inputs signals from external devices (display devices, operating devices, and others) in a form capable of being processed by the information processing apparatus 1. An output I/F 750 outputs signals to external devices (display devices) in a form capable of being processed by the display devices. As used herein, the term "unit" generally refers to any combination of software, firmware, hardware, or other component, such as circuitry, that is used to effectuate a purpose.

(First Embodiment)

In relation to a first embodiment, a method for measuring shape information on a measurement target object at high speeds will be explained.

Figure 1:
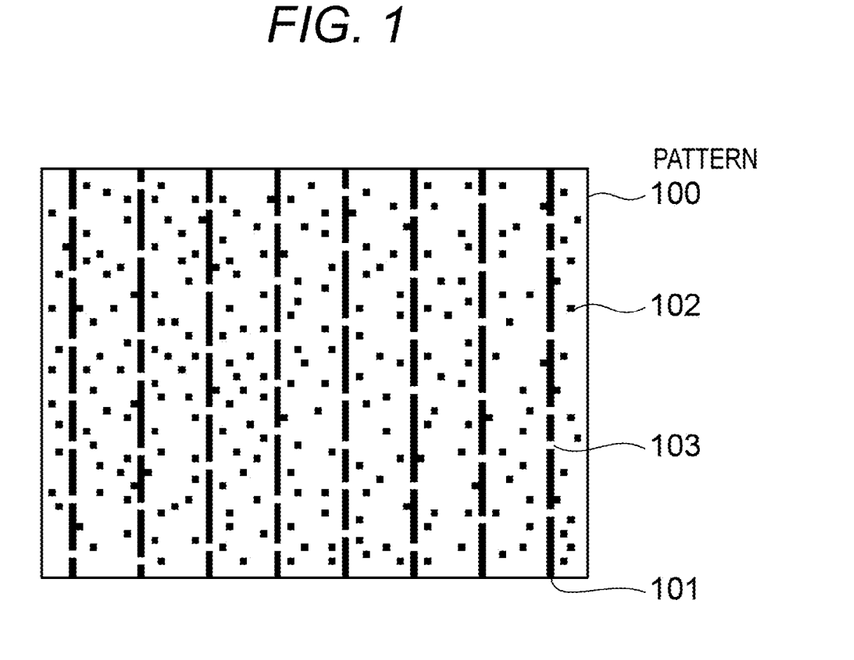
FIG. 1 is a diagram illustrating an illumination pattern acquired by an information processing apparatus in a first embodiment.

In the embodiment, the shape information indicates the values of distances to individual parts of the measurement target object with reference to a coordinate system of an imaging apparatus. As illustrated in FIG. 1, an illumination pattern 100 for use in the embodiment is composed of one or more lines 101 (hereinafter, the lines will be called reference features) and a design with dots 102 as elements.

The reference features have identification information 103 for identifying the reference features on the illumination pattern 100 to which reference features observed on the image belong. In the embodiment, the identification information is represented by a plurality of cuts in the lines.

In the embodiment, first, positions on the illumination pattern 100 corresponding to the reference features on an image of the observed measurement target object are calculated to measure shape information on the measurement target object onto which the reference features are projected. Then, as for respective parts on the image, candidates for the shape information are set based on the shape information measured from the reference features. Next, as for the candidates for the shape information set for the image parts, the degrees of correspondence between the image parts and corresponding parts on the illumination pattern 100 equivalent to the candidates for the shape information are calculated based on the correlations between image areas including the image parts and areas on the illumination pattern 100 including the corresponding parts. In this example, the degrees of correspondence indicate the heights of correlations between the image areas including the noted image parts and the areas on the illumination pattern 100. The degrees of correspondence are calculated by block matching or the like, for example. Finally, out of the candidates for the shape information for which the degrees of correspondence with the image parts have been calculated, the candidates for the shape information with high degrees of correspondence are output as correct shape information for the image parts.

In the embodiment, the candidates for the shape information are set for the image parts from the shape information calculated from the reference feature. The solution is selected from among the set candidates, which decreases the amount of calculation as compared to the calculation with all the shape information within the search area as candidates. This allows high-speed measurement of the shape information on the measurement target object.

Figure 2:
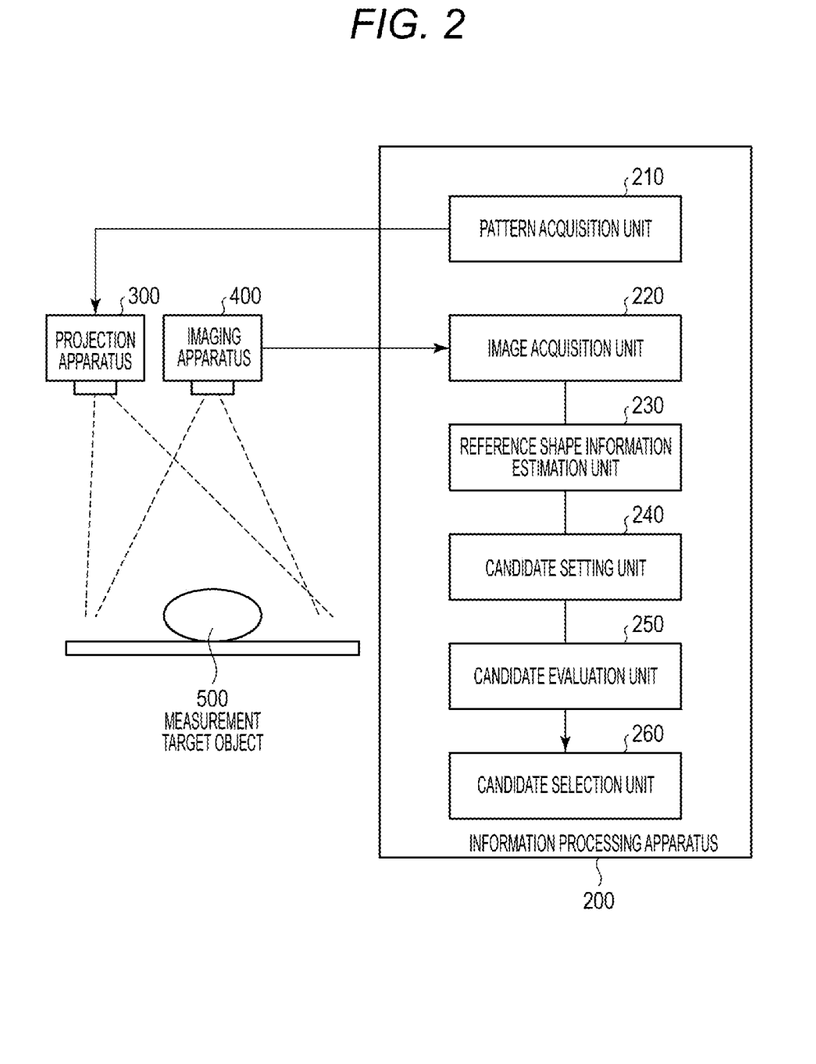
FIG. 2 is a diagram illustrating a configuration of the information processing apparatus in the first embodiment.

FIG. 2 illustrates a configuration of the embodiment. First, an information processing apparatus 200 of the embodiment is composed of a pattern acquisition unit 210, an image acquisition unit 220, a reference shape information estimation unit 230, a candidate setting unit 240, a candidate evaluation unit 250, and a candidate selection unit 260. Reference sign 300 indicates a projection apparatus, and 400 an imaging apparatus. Reference sign 500 indicates a measurement target object.

The projection apparatus 300 is a projector that projects an image of the illumination pattern. 100 by light or the like. Intrinsic parameter information on the projection apparatus 300 such as a focal length, a principal point position, and a lens distortion parameter, and information on position and orientation of the projection apparatus 300 relative to the imaging apparatus 400 are calibrated in advance. The calibration can be performed by a publicly known method, for example, the one described in the following document:

M, Kimura, "Projector Calibration using Arbitrary Planes and Calibrated Camera "Computer Vision and Pattern Recognition, CVPR, 2007.

The imaging apparatus 400 is a camera capturing grayscale images. Intrinsic parameter information on the imaging apparatus 400 such as a focal length, a principle point, and a lens distortion parameter are calibrated in advance. The calibration can be performed by a publicly known method, for example, the one described in the following document:

R. Y, Tsai, "A versatile camera calibration technique for high-accuracy 3D machine vision metrology using off-the-shelf TV camer and lenses" IEEE Journal of Robotics and Automation, vol. RA-3, no. 4, 1987.

The pattern acquisition unit 210 acquires an image of the illumination pattern 100 for projection onto the measurement target object 500. The acquired Pattern is a two-dimensional image that is composed of one or more reference features (first features) and a design (second feature) as illustrated in FIG. 1. In the embodiment, the reference features are lines and the design is dots. The dots are arranged at random with a predetermined capability (A %), for example. The identification information (cuts in the lines) is arranged on the lines such that a space between the adjacent cuts in the same line becomes B+$\Delta$B. In this example, $\Delta$B indicates a uniform random number occurring within a range of "-$\varepsilon$ to $\varepsilon$" where $\varepsilon$ denotes a fixed value specified by the user. FIG. 1 illustrates the illumination pattern 100 in which the background is in white and the reference features and the design are in black. The light of the pattern is reversed such that the background is projected with low brightness and the reference features and the design are projected with high brightness.

Figure 4:
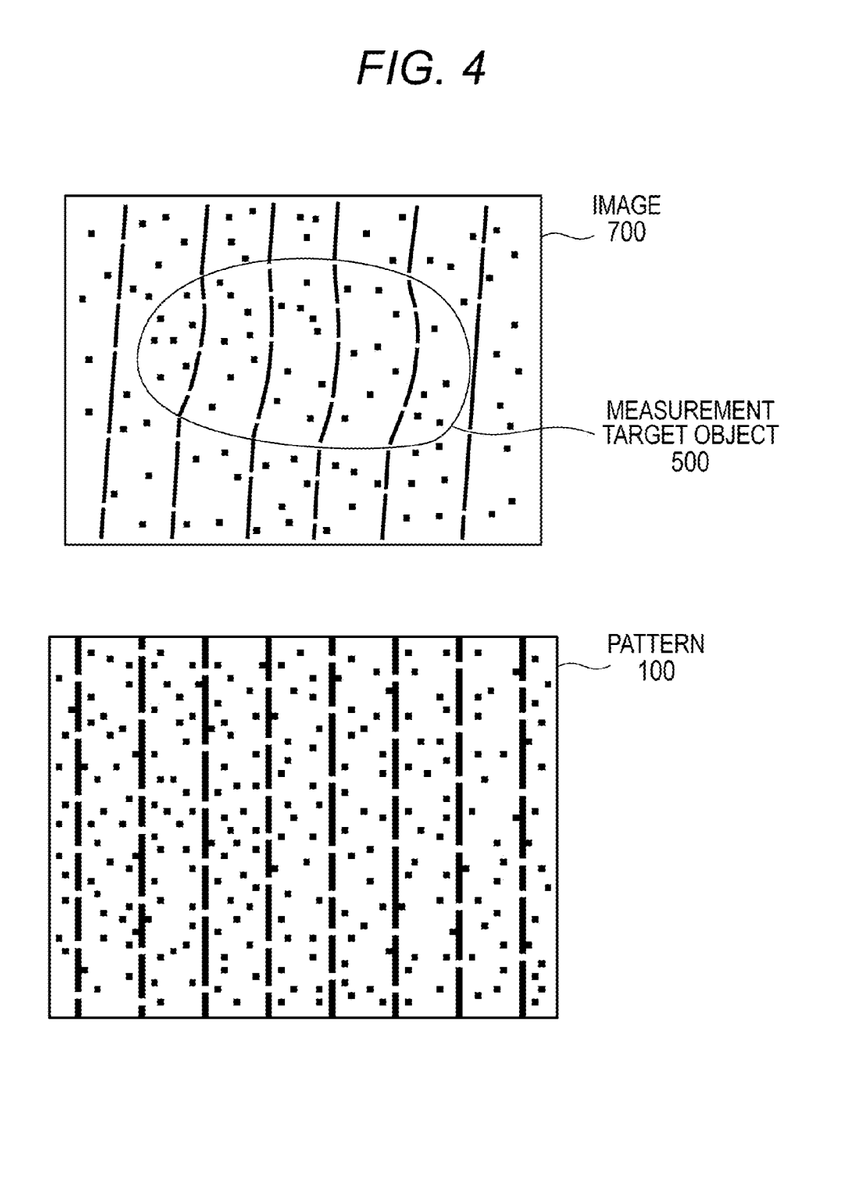
FIG. 4 is a diagram illustrating an example of an image in the first embodiment.

The image acquisition unit 220 acquires an image 700 (captured image) obtained by the imaging apparatus 400 imaging the measurement target object 500 with projection of the illumination pattern 100. FIG. 4 illustrates an example of the acquired image 700.

The reference shape information estimation unit 230 calculates positions on the illumination pattern 100 corresponding to the reference features observed on the image 700 based on the reference signs included in the reference features to measure the shape information on the measurement target object onto which the reference features are projected. The shape information in the embodiment refers to the values of distances to the parts of the measurement target object with reference to the coordinate system of the imaging apparatus.

The candidate setting unit 240 sets the candidates for shape information in image parts on the image 700 based on the shape information of the reference features on the image 700 estimated by the reference shape information estimation unit 230.

In the embodiment, the image parts on the image 700 refer to pixels.

For the candidates for the shape information set on the image parts on the image 700, the candidate evaluation unit 250 evaluates the degrees of correspondence between image areas including the image parts and areas including the corresponding parts on the illumination pattern 100 equivalent to the candidates for the shape information, based on the correlation between the areas.

For the image parts on the image 700, the candidate selection unit 260 selects, from among the candidates for which the candidate evaluation unit 250 have calculated the degrees of correspondences, the candidates with high degrees of correspondence as correct shape information in the image parts.

These functional units are implemented by the CPU 710 developing the programs stored in the ROM 720 on the RAM 730, and executing processes according to flowcharts described later. Alternatively, when hardware is provided as a substitute for software processing using the CPU 710, for example, an arithmetic units or circuit may be configured in correspondence with the processes of the functional units described herein.

Figure 3:
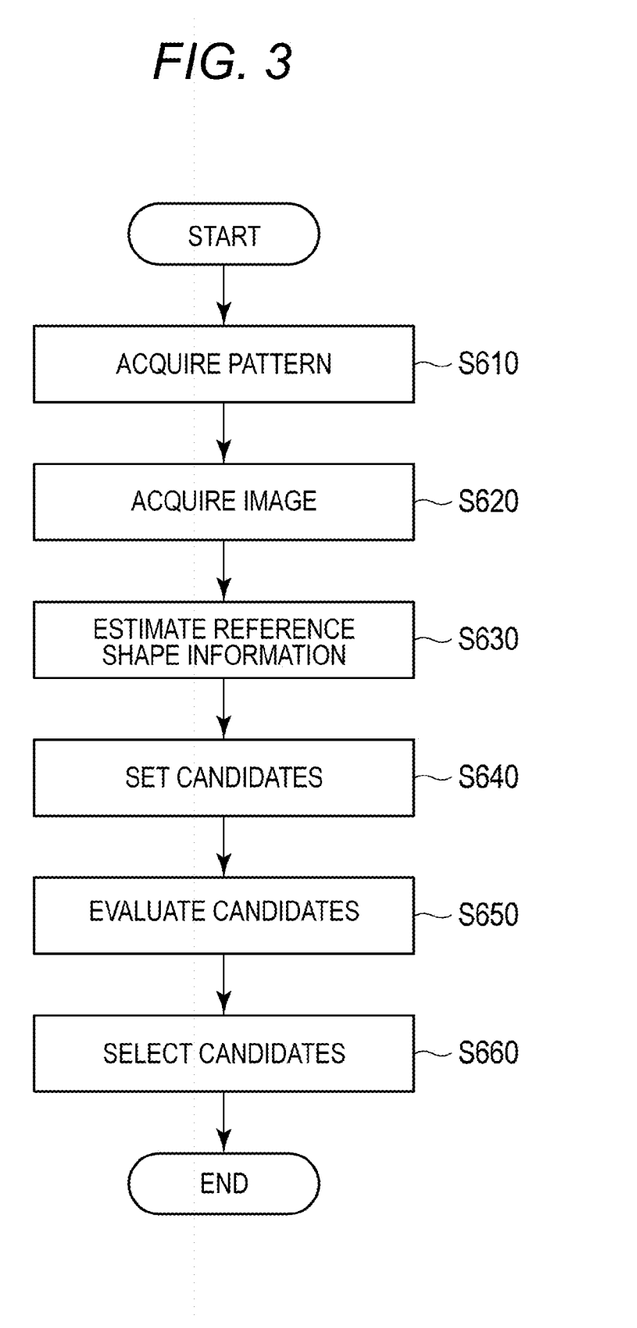
FIG. 3 is a flowchart of information processing in the first embodiment.

Next, a processing procedure of the embodiment will be explained. FIG. 3 is a flowchart of the processing procedure of the embodiment.

(S610)

At S610, the pattern acquisition unit 210 acquires an image of the illumination pattern 100. Then, the pattern acquisition unit 210 sends the same to the projection apparatus 300 via an interface not illustrated. The projection apparatus 300 acquires the pattern from the pattern acquisition unit 210 and projects the acquired pattern onto a space including the measurement target object 500. While the projection apparatus 300 projects the acquired pattern onto the space including the measurement target object 500, the imaging apparatus 400 captures an image of the space.

(S620)

At S620, the image acquisition unit 220 acquires the image 700 captured by the imaging apparatus 400 from the image of the illumination pattern 100 projected onto the measurement target object 500. FIG. 4A illustrates an example of the acquired image 700.

(S630)

At S630, the reference shape information estimation unit 230 calculates the positions on the illumination pattern 100 corresponding to the reference features observed on the image 700 to estimate the shape information on the measurement target object (acquisition of the shape information).

First, the reference shape information estimation unit 230 detects the reference features from the image 700. In the embodiment, the reference features are lines, and therefore the lines are detected. Specifically, the reference shape information estimation unit 230 applies a Sobel filter to the image 700 to apply extreme values of brightness on the image (hereinafter, called detected points). Next, the reference shape information estimation unit 230 labels adjacent detected points to detect the reference features as the lines in which the adjacent detected points are aligned.

Next, the reference shape information estimation unit 230 associates the detected reference features with one another based on the identification information 103 (the cuts in the lines) included in the reference features. The association of the reference features here refers to calculating the positions of the reference features on the illumination pattern 100 corresponding to the reference features detected from the image 700.

The method for association with the use of the cuts is publicly known and described in Japanese Patent Application Laid-Open No. 1-274007. Specifically, first, for the reference features detected from the image 700, two cuts in the same reference feature are selected, and two epipolar lines are calculated on the illumination pattern 100. The positions on the illumination pattern 100 corresponding to the cuts in the reference feature detected from the image 700 are estimated to be cuts as geometric features existing on the epipolar lines calculated on the illumination pattern 100. According to this method, the positions corresponding to the detected reference features are calculated by searching for the reference features in which there is a match between the two epipolar lines calculated from the cuts and the cuts in the reference features on the illumination pattern 100. Accordingly, it is possible to calculate the positions on the illumination pattern 100 corresponding to the reference features detected from the image 700.

Next, based on the results of the association of the reference features, the reference shape information estimation unit 230 estimates the shape information in the reference features observed on the image 700. The shape information (the values of distances in the embodiment) is calculated from the positions of the reference features on the image 700 and the corresponding positions on the illumination pattern 100 based on the principles of triangulation method. In the embodiment, the reference features are lines and therefore the method for calculation is the same as the method for calculation of the shape information based on the optical cutting method.

Hereinafter, out of the reference features detected from the image 700, parts on the reference features on which the shape information has been estimated will be designated as reference parts Fi (i=1 to M), and their shape information as Si. In this example, the suffix i denotes the number for each of the parts on the reference features, and M denotes the total number of the parts on which the shape information has been estimated. The reference parts Fi have parameters indicative of two-dimensional coordinates on the image 700. The shape information Si has one-dimensional distance values (Di) in the embodiment. Accordingly, the reference shape information estimation unit 230 estimates the shape information (acquires the initial values of the shape information) in the areas including the reference features (lines) within the captured image.

(S640)

The candidate setting unit 240 sets the candidates for the shape information in the respective image parts Pk (k=1 to N) on the image 700 (within the captured image) based on the shape information Si on the reference parts Fi estimated by the reference shape information estimation unit 230.

In the embodiment, the reference sign Pk denotes all the pixels on the image 700. The suffix k denotes the numbers for the pixels, and the suffix N the total number of the pixels. The reference parts Fi have parameters indicative of two-dimensional coordinates on the image 700.

In this example, the candidate setting unit 240 propagates the shape information Si possessed by the reference parts Fi to the surrounding image parts Pk, and set the same as candidates for the shape information in the image parts Pk. Specific process details will be described below.

First, the candidate setting unit 240 selects the reference parts Fi as references for setting the candidates. In the embodiment, 0 to M are sequentially selected with changes in the number i for the reference parts.

Next, the candidate setting unit 240 sets the candidates for the shape information in the image parts Pk surrounding the reference parts (reference areas) Fi, based on the shape information Si on the reference parts Fi. Specifically, when the candidate for the shape information in the image part Pk existing within a predetermined range R from the reference parts Fi is designated as Ski, the candidate setting unit 240 sets Ski =Si. When there is a plurality of image parts Pk within the predetermined range R, the candidate setting unit 240 sets Si as the candidate for the shape information in each of the image parts.

The candidate setting unit 240 performs the foregoing process on one or more reference parts Fi. In the embodiment, the candidate setting unit 240 performs this calculation on all the reference parts Fi (i =1 to M). Since the candidates are set with reference to the plurality of reference parts Fi, one image part may have a plurality of candidates.

(S650)

The candidate evaluation unit 250 calculates the degrees of correspondence between the candidates for the shape information set on the image parts Pk (first areas) by the candidate setting unit 240, based on the correlation between the areas on the image 700 including the image parts Pk and the areas including the corresponding parts on the illumination pattern 100 equivalent to the shape information. The image areas of the image parts Pk on the image include the reference features and the design projected by the projection apparatus 300. Therefore, calculating the correlation between the areas means calculating whether there is a match between the reference features and the design in the areas.

First, the candidate evaluation unit 250 decides corresponding parts Qki on the illumination pattern 100 (within the pattern) corresponding to the image parts Pk on which the candidates for the shape information are set, based on the candidates Ski for the shape information in the image parts Pk. In this example, the corresponding parts Qki have parameters indicative of two-dimensional coordinates on the illumination pattern 100. The corresponding parts Qki can be determined by calculating three-dimensional positions in the coordinate system of the imaging apparatus 400 from the values of distances included in the shape information and then projecting the calculated three-dimensional positions onto the illumination pattern 100 based on the relative positions and orientations of the imaging apparatus 400 and the projection apparatus 300.

Next, the candidate evaluation unit 250 calculates the degrees of correspondence by block matching based on the areas surrounding the reference parts Pk and the areas surrounding the corresponding parts Qki on the pattern. In this example, the areas surrounding Pk and Qki are rectangular blocks of size W centered on the respective positions. The degree of correspondence is set as the reciprocal number of SSD (Sum of Squared Difference). That is, as the value of the SSD is smaller (i.e., the difference between the blocks is smaller), the degree of correspondence becomes larger.

(S660)

The candidate selection unit 260 selects, from among the candidates for which the degrees of correspondence have been calculated in the image parts Pk on the image, the candidates with high degrees of correspondence as correct shape information in the image parts Pk. In the embodiment, the candidate selection unit 260 selects the candidates with degrees of correspondence equal to or higher than a predetermined threshold value T. When there is a plurality of candidates for one part, the candidate selection unit 260 selects the candidate with the highest degree of correspondence from among the candidates with the degrees of correspondence equal to c higher than the threshold value T.

As described above, in the embodiment, the candidates for the shape information are set in the image parts from the shape information calculated from the reference features. Since the solution is selected from among the set candidates, the amount of calculation becomes smaller as compared to the case in which the calculation is performed with all the shape information within the search area as candidates. This makes it possible to measure (derive) the shape information on the measurement target object at high speeds.

In the embodiment, the projection apparatus 300 may be any device that projects a two-dimensional illumination pattern. For example, the projection apparatus 300 may be a document projector that projects two-dimensional images or may be a device with a combination of a light source and a mask pattern. The pattern to be projected may be a grayscale pattern or a color pattern. In the case of setting a mask pattern, the pattern is physically set in the projection apparatus 300, and therefore it is not necessary to input the pattern from the pattern acquisition unit 210.

In the foregoing explanation, the reference features and the design on the illumination pattern are projected with higher brightness than the background on the illumination pattern. Alternatively, the reference features and the design on the illumination pattern may be any features that are different in brightness or colors as compared to the background on the illumination pattern. For example, the reference features and the design on the illumination pattern may be projected with lower brightness than the background on the pattern. Pattern variations will be described below in relation to a fourth modification example.

The pattern may be acquired from a storage area not illustrated in the information processing apparatus 200 or from an external information source via a network. The storage area may be a hard disc or a RAM.

The image acquired by the image acquisition unit 220 may be any two-dimensional image captured by the imaging apparatus while the illumination pattern is projected onto the measurement target object. For example, the image may be a grayscale image or a color image. As the method for acquiring the image, the image may be acquired directly from the imaging apparatus 400 or the image stored temporarily in the memory may be acquired later.

The image parts in which the shape information is estimated may be pixels of the image as in the first embodiment or may be a plurality of blocks divided from the image. The parts may be identical or different in size or shape.

In the foregoing explanation, the reference shape information estimation unit 230 outputs the shape information only in point groups on the reference features. Alternatively, the shape information for point groups between the reference features may be calculated by interpolation or the like, and be output as dense shape information. The interpolation may be performed by any method for calculating the shape information between the reference features based on the shape information in the reference features. For example, the image may be divided into a plurality of areas, and the shape information existing in the areas may be interpolated based on average values of shape information existing in the areas. Alternatively, out of the point groups on the reference features for which the shape information has been estimated on the image, three adjacent points may be connected to form a triangular patch and then the pixels in the patch may be interpolated from the shape information in the three points. When the reference features are lines, the shape information between two adjacent lines may be set by linear interpolation. The output shape information may be all or some of the calculated point groups For example, only the shape information in the point groups within a predetermined range of the image may be output, or only the shape information in the point groups within a range of a predetermined distance may be output. The shape information determined by the interpolation may be used as reference parts for the candidate setting unit 240 to set candidates.

In the embodiment, the candidate setting unit 240, the candidate evaluation unit 250, and the candidate selection unit 260 may repeat the processes at S640, S650, and S660. In this case, the candidate setting unit 240 sets the candidates for the shape information again based on the shape information in the image parts selected by the candidate selection unit 260. Specifically, after the completion of the process by the candidate selection unit 260 in the first cycle, the candidate setting unit 240, the candidate evaluation unit 250, and the candidate selection unit 260 repeat the processes in this order. In the second and subsequent cycles, the candidate setting unit 240 sets the candidates for the shape information with reference to the shape information in the image parts selected by the candidate selection unit 260 in the previous cycle, instead of the shape information in the reference parts. The number of repetitions may be set under any standard. For example, the processes may be repeated a predetermined number of times or may be repeated until the degrees of correspondence between the shape information selected by the candidate selection unit 260 reach a predetermined value or less.

The candidate setting unit 240 sets the candidates for the shape information with reference to the one or more reference parts Fi. The parts to be referenced may be all the reference parts Fi as in the first embodiment or may be some of the reference parts Fi. When the candidate setting unit 240, the candidate evaluation unit 250, and the candidate selection unit 260 repeat the processes at S640, S650, and S660, the reference parts may be changed at each repetition. For example, the reference part may be selected with changes in the number i for the reference parts such that the reference part Fi with i=1 is used in the first cycle, and the reference part Fi with i=2 is used in the second cycle.

(Second Embodiment)

In a second embodiment, a method for treating the distance values of the measurement target object and the orientations of the planes of the measurement target object (normal information) as the shape information will be explained. The normal information here indicates the amount of change in the distance value relative to changes in the positions of the pixels on the image 700. Specifically, the variation of the distance vale relative to an x axis (lateral direction) of the image is designated as A, and the variation in the distance value relative to a y axis (vertical direction) of the image is designated as B. The two parameters indicate the normal information. The distance value is designated as D.

In the embodiment, the reference shape information estimation unit 230, the candidate setting unit 240, and the candidate evaluation unit 250 perform different processes from those in the first embodiment.

First, the reference shape information estimation unit 230 estimates the distance values and the normal information in the reference features observed on the image 700. The distance values are estimated by the method described above in relation to the first embodiment. The normal information is estimated based on spatial changes in the estimated distance values. Specifically, for example, the distance values of the pixels between the reference features are interpolated, and then the differences between the distance values of adjacent pixels are taken to set values Ai and Bi. As described above, the reference shape information estimation unit 230 of the embodiment estimates three-dimensional data (Di, Ai, and Bi) as the shape information Si on the reference parts Fi.

Next, the candidate setting unit 240 sets the candidates for the shape information in the image parts Pk on the image, based on the distance values and the normal information estimated from the reference features. The candidate for the shape information set in the image part Pk existing within a predetermined range R from the reference part Fi is designated as Ski=(Dki, Aki, and Bki). The differences between the positions of the reference part Fi and the image part Pk on the image 700 are designated as Uki and Vki. In this example, the reference sign Uki indicates the difference in the x-axis direction of the image, and the reference sign Vki indicates the difference in the y-axis direction of the image. The distance value Dki is set as Dki=Di +Ai·Uki+Bi·Vki taking into account changes in the distance value in the normal information. The normal information Aki and Bki is set as Aki=Ai and Bki=Bi. A in the first embodiment, when there is a plurality of image parts Pk within the predetermined range R, the candidate Ski for the shape information is set for each of the image parts Pk. However, the candidates are set taking into account changes in the distance value in the normal information as described above.

Next, the candidate evaluation unit 250 calculates the degrees of correspondence between the candidates for the shape information set in the image parts Pk by the candidate setting unit 240, based on the correlation between the areas on the image including the image parts Pk and the areas including the corresponding parts on the illumination pattern 100 equivalent to the shape information. In the embodiment, the correlation between the blocks is calculated as in the first embodiment. In the embodiment, however, the blocks are deformed and projected onto the illumination pattern 100 based on the gradients of the planes of the measurement target object (normal information), thereby to calculate more accurately the correlation between the areas on the image 700 and the areas on the illumination pattern 100. To do this, the positions on the illumination pattern 100 corresponding to points in the blocks are calculated. Specifically, the blocks on the image including the image parts Pk are regarded as planes, and the distance values of the pixels in the blocks are calculated from the shape information in the image parts Pk on the center of the blocks. In this example, the distance values of the pixels in the blocks can be calculated by adding changes resulting from the normal information Aki and Ski with reference to the distance values Dki of the image parts Pk. Next, the positions on the illumination pattern 100 are calculated based on the distance values of the pixels centered on the image parts Pk. Then, from the correspondence relationship, the differences between the pixels of the blocks centered on the image parts Pk and the pixels at the corresponding positions on the illumination pattern 100 are calculated. Finally, the sums of squares (SSDs) of the differences calculated for the pixels are determined, and the reciprocal numbers of the SSDs are set as the degrees of correspondence as in the first embodiment.

The pattern acquisition unit 210, the image acquisition unit 220, and the candidate selection unit 260 perform the same processes as those in the first embodiment and thus descriptions thereof are omitted.

As described above, in the embodiment, the distance values and the normal information are treated the shape information. In addition to the distance values, the normal information is used for calculation to allow the shape of the measurement target object to be measured more accurately.

In the embodiment, the distance values and the normal information are treated as the shape information. Alternatively, the constitutional elements of the shape information may be any information indicative the positions of planes of the measurement target object in a three-dimensional space (hereinafter, called position information) or any information indicative of the normals of the planes (normal information). The position information here may be distances, parallaxes, or three-dimensional coordinates. The normal information may be the amount of change in the distance values relative to change in the positions of the pixels, or three-dimensional vectors.

The shape information may be both or either of the position information and the normal information. When some element of the shape information is a variable, the other element may be a fixed value for use in the calculation. For example, when the shape information is estimated with only the position information as a variable, the normal may be assumed to be opposite to the line-of-sight direction of the imaging apparatus 400 and be given as a fixed value. For example, when the shape information is estimated with the normal information a variable, the position information may indicate the general position of the measurement target object as a prescribed value.

(First Modification Example)

As a first modification example, variations of a method for setting candidates for shape information by the candidate setting unit 240 will be explained.

The image parts Pk in which the reference shape information estimation unit 230 sets the candidates for the shape information based on the shape information may be any image parts Pk on the image 700. As in the first embodiment, the candidates for shape information may be set in the parts Pk within the predetermined range R surrounding the parts Fi in which the shape information is estimated, or the candidates for shape information may be set in parts adjacent to the reference parts Fi or some of the parts. For example, the candidates may be set for the parts adjacent to the reference parts Fi in the x-axis direction or the y-axis direction, or the candidates may be set in the parts separated from the reference parts Fi.

When the candidate setting unit 240, the candidate evaluation unit 250, and the candidate selection unit 260 repeat the processes at S640, S650, and S660, the positions of the candidates to be set may be changed at each repetition. For example, the candidate for shape information may be set in parts in a plus direction of the x axis of the noted reference part in the first cycle, and the candidate for shape information may be set in parts in a minus direction of the x axis in the second cycle.

(Second Modification Example)

As a second modification example, a method for estimating shape information by the reference shape information estimation unit 230 and variations of reference features will be explained.

A method for identifying the reference features by the reference shape information estimation unit 230 may be any method to estimate shape information by calculating the positons on the illumination pattern corresponding to the reference features observed on the image.

For example, when the reference features are lines, the lines may be detected by any method for extracting the positions on the lines observed on the image as labeled lines. The lines may be detected by labeling edges detected by a Sobel filter or by turning the binalized image into fine lines with a predetermined threshold.

The detected lines may be associated by any method for calculating the positons on the illumination pattern corresponding to the lines observed on the image. For example, as in the first embodiment, cuts may be added at random to the lines on the illumination pattern 100 and the corresponding positions of the lines may be calculated based on the positions of the cuts observed on the image. In addition, reference signs of at least one of brightness, color, and shape may be added to the lines on the illumination pattern, and the lines may be identified by the reference signs observed on the image. For example, as illustrated in an illumination pattern 110 of FIG. 5, a reference sign with a different brightness value (111 in FIG. 5) may be arranged as identification information on the lines. The reference sign may be arranged between the lines, not on the lines. Further, as illustrated in an illumination pattern 120 of FIG. 5, lines of different colors (121 in FIG. 6) may be projected as identification information, and the corresponding positions on the illumination pattern 121 may be calculated based on the colors of the lines observed on the image. Instead of the colors of the lines, the colors of the spaces between the lines may be changed. Alternatively, the brightness value on the lines of the illumination pattern may be modulated and the corresponding positions on the illumination pattern may be calculated based on changes in the brightness of the lines observed on the image.

Figure 5:
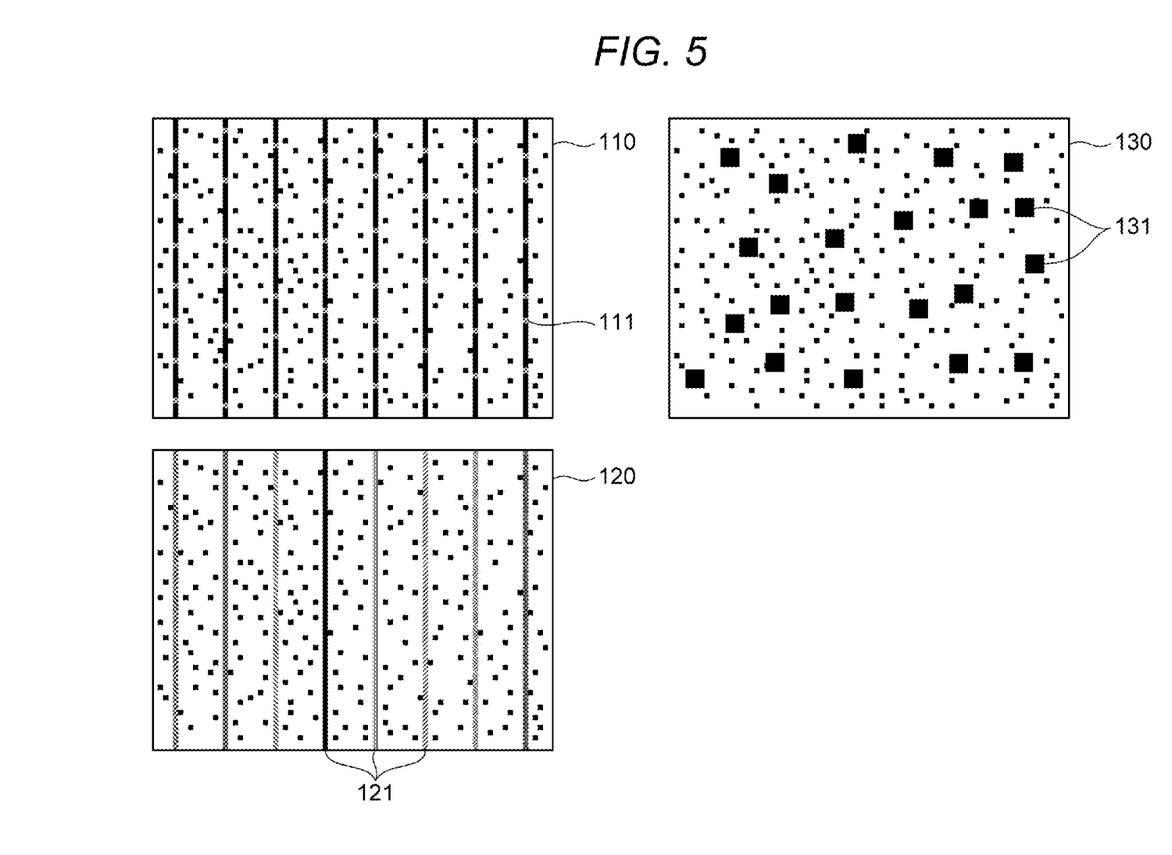
FIG. 5 is a diagram illustrating variations of reference features in a second modification example.

The reference features may be any features that allow the calculation of the positions on the illumination pattern corresponding to the reference features observed on the image. The reference features may be lines as in the first embodiment or any other features. For example, as illustrated in an illumination pattern 130 of FIG. 5, the reference features may be dots (131 in FIG. 5) different in shape from the design on the illumination pattern. In this case, the processes for detection and association used for the reference shape information estimation unit 230 to calculate the shape information on the dots 131 can be performed as described below. The dots 131 may be detected by binalizing the image and selecting an area of a predetermined or larger size, or may be detected by dot-shaped template matching, for example. The dots 131 may be associated by matching with the positions on the epipolar lines of the illumination pattern, or may be associated based on the changed colors and shapes of the dots. The reference features other than dots may have a polygonal or any other shape. FIG. 5 illuminates the illumination pattern in which the background is in white and the reference features and the design are in black. The light of the pattern is reversed such that the background is projected with low brightness and the reference features and the design are projected with high brightness.

(Third Modification Example)

As a third modification example, variations of design on the illumination pattern will be explained.

Figure 6:
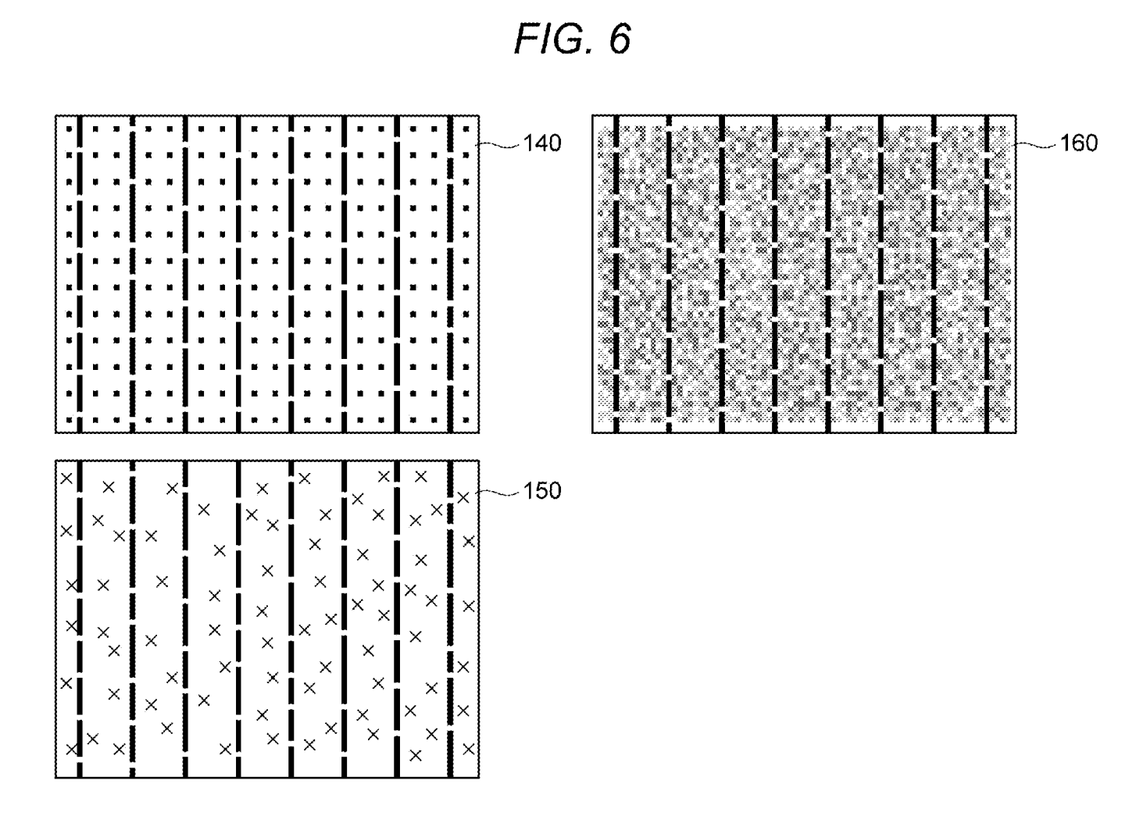
FIG. 6 is a diagram illustrating variations of designs in a third modification example.

The elements of the design on the illumination pattern are different in at least one of shape, size, brightness, and color from the reference features, and the design is not a solid design on the entire illumination pattern. Specifically, the design may be a plurality of dots arranged at random as in the first embodiment or a plurality of dots arranged at equal intervals as illustrated with reference sign 140 of FIG. 6. Alternatively, the design may have any elements other than dots as illustrated with reference sign 150 of FIG. 6. The elements of the design may be the same in brightness and color, or may be different in brightness and color among the parts of the illumination pattern. Instead of having a plurality of elements such as dots, the design may be formed by modulating the brightness and the color tone as illustrated with reference number 160 in FIG. 5. In any of the designs, the degrees of correspondence can be evaluated by determining the correlation between the parts on the image and the corresponding positions on the illumination pattern. FIG. 6 illuminates the illumination pattern in which the background is in white and the reference features and the design are in black. The light of the pattern is reversed such that the background is projected with low brightness and the reference features and the design are projected with high brightness.

(Fourth Modification Example)

As a fourth modification example, variations of a method for evaluating the degrees of correspondence by the candidate evaluation unit 250 will be explained.

The method for evaluating the degrees of correspondence may be any method for calculating the degrees of correspondence indicating whether there is correspondence between the image parts and the corresponding parts with the candidates for the shape information set by the candidate setting unit 240, based on the correlation between the areas on the image including the image parts and the areas on the illumination pattern including the corresponding parts. The method may be pixel matching or block matching. In the case of block matching, the correlation between blocks may be represented by SSD as in the first embodiment or SAD (Sum of Absolute Difference). The shape of the blocks may be any shape such as square or circle. The feature amounts may be extracted from the blocks to calculate the degrees of correspondence based on the differences in the feature amounts. The feature amounts may be statistical values such as averages or variances of the brightness values in the blocks may be feature amounts based on SIFT (Scale-Invariant Feature Transform) or the like.

In the case of block matching, as in the first embodiment, for the blocks centered on the image parts Pk, the positions Qki on the illumination pattern are calculated based on the candidates Ski for the shape information in the image parts Pk to determine the correlation between the areas on the image centered on the image parts Pk and the areas on the illumination pattern centered on the Qk. By this method, the positions on the illumination pattern corresponding to the center positions of the blocks are calculated. Alternatively, as in the second embodiment, the positions on the illumination pattern corresponding to the positions in the blocks may be calculated to determine the correlation between the image and the illumination pattern from the correspondence relationship.

Other Embodiments

Embodiment(s) of the present disclosure can also be realized by a computer of a system or apparatus that reads out and executes computer executable instructions (e.g., one or more programs) recorded on a storage medium (which may also be referred to more fully a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one (yr more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

<Advantageous Effects of the Examples>

In the first embodiment, the candidates for the shape information in the image parts on the image are set from the shape information calculated from the reference features. The solution is selected from among the set candidates, which decreases the amount of calculation as compared to the calculation with all the shape information within the search area as candidates. This allows high-speed measurement of the shape information on the measurement target object.

In the second embodiment, the shape information includes the position information indicating the positions of the planes of the measurement target object in the three-dimensional space and the parameters for the normal information indicating the orientations of the planes. The shape of the measurement target object can be measured more accurately taking into account the normal information as well as the position information.

<Definitions>

In the present disclosure, the illumination pattern acquired by the pattern acquisition unit may be any illumination pattern that is composed of a design and one or more reference features. The design is different in at least one of shape, size, brightness, and color from the reference features, and is not a solid design in the entire illumination pattern. For example, the design may have a plurality of dots arranged at random or a plurality of dots arranged at regular intervals illustrated with reference sign 140 in FIG. 6. The design may have any shape other than dots or may be formed by modulating the brightness and the color tone. The reference features may be any other features that allow the calculation of the positions on the illumination pattern corresponding to the positions of the reference features observed on the image in the reference shape information. For example, the reference features may be lines or may have any other shape such as circle or polygon.

The image acquired by the image acquisition unit may be any two-dimensional image that is captured by the imaging apparatus while the illumination pattern is projected onto the measurement target object. For example, the image may be a grayscale image or a color image. The image may be acquired directly from the imaging apparatus or the image stored temporarily in the memory may be read into the apparatus.

The method for estimating the shape information may be any method for calculating the positions on the illumination pattern corresponding to the reference features observed on the image and estimating the shape information by triangulation method. The shape information here includes at least one of the information indicating the positons of planes of the measurement target object in the three-dimensional space and the information indicating the normals of the planes. The information indicating the positons in the three-dimensional space may be distances or parallaxes, or three-dimensional coordinates. The information indicating the normals of the planes may be the amount of change in distance values relative to change in the positions of the pixels or three-dimensional vectors. In addition, the shape information between the reference features observed on the image may be interpolated and output.

The parts in which the candidates for the shape information are set by the candidate setting unit may be any parts in the image. For example, for the shape information estimated by the reference shape information estimation unit, the candidates for the shape information may be set in the parts close to one another on the image or the candidates for the shape information may be set on the entire image. A plurality of candidates for the shape information may be set in one part. In the present disclosure, when the candidate setting unit, the candidate evaluation unit, and the candidate selection unit repeat the processes, the parts in which the candidates are set may be changed at each repletion.

The method for evaluating the degrees of correspondence by the candidate evaluation unit may be any method for calculating the degrees of correspondence between the candidates for the shape information set by the candidate setting unit based on the correlation between the areas on the image and the areas on the illumination pattern equivalent to the candidates for the shape information. For example, the degrees of correspondence may be calculated based on the SSD (Sum of Squared Difference) or SAD (Sum of Absolute Difference) of the brightness values in the areas on the image and the areas on the pattern, or the feature amounts in the areas may be extracted to calculate the degrees of correspondence based on the differences between the extracted feature amounts, for example. The degrees of correspondence here refer to the heights of correlation between the noted areas on the image and the areas on the illumination pattern.

The method for selecting the candidates for the shape information by the candidate selection unit may be any method for selecting the candidates for the shape information with high degrees of correspondence. For example, the candidates for the shape information with degrees of correspondence equal to or larger than the predetermined threshold value may be selected or the candidate for the shape information with the highest degree of correspondence out of the candidates for the shape information set for each parts may be selected.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-150502, filed Jul. 30, 2015, which is hereby incorporated by reference herein in its entirety.

What is claimed is:

1. An information processing apparatus comprising:
a memory; and
a processor in communication with the memory, the processor configured to provide:
an acquisition unit configured to acquire an image captured by an imaging apparatus while a pattern including a plurality of first features and a second feature different from the first features is projected onto a measurement target object;
an initial value acquisition unit configured to associate the first features included in the projected pattern and the first features included in a captured image based on the captured image to identify the first features included in the captured image, and acquire an initial value of shape information on the measurement target object in an area including the first features within the captured image based on an identified result;
a setting unit configured to set a candidate for the shape information in a first area based on an initial value of shape information in an area surrounding the first area within the captured image;
an evaluation unit configured to decide an area in the pattern corresponding to the first area as a second area based on the candidate for the shape information in the first area, and evaluate a correlation between the first area and the second area based on the second feature included in the first area and the second feature included in the second area; and
a derivation unit configured to derive the shape information in the first area based on the correlation evaluated by the evaluation unit.

2. The information processing apparatus according to claim 1, further comprising a decision unit configured to decide the second area corresponding to the first area in the pattern based on the set candidate for the shape information in the first area.

3. The information processing apparatus according to claim 1, wherein the derivation unit that derives the shape information in the first area based on the candidate for the shape information in the first area when the correlation between the area in the pattern decided based on the initial value of the shape information in the first area and the first area is higher than the correlation between the second area in the pattern decided based on the candidate for the shape information in the first area and the first area.

4. The information processing apparatus according to claim 1, wherein the setting unit sets the initial value of the shape information set in a reference area residing in a predetermined direction from the first area as the candidate for the shape information in the first area.

5. The information processing apparatus according to claim 4, wherein the setting unit sets a value obtained by changing the initial value of the shape information in the reference area residing in a predetermined direction from the first area based on an amount of change between the initial value of the shape information in the first area and the initial value of the shape information in the reference area, as the candidate for the shape information in the first area.

6. The information processing apparatus according to claim 1, wherein the setting unit, the evaluation unit, and the derivation unit repeat the processes with the shape information derived by the derivation unit as the initial value.

7. The information processing apparatus according to claim 1, wherein the evaluation unit evaluates the correlation based on a difference between brightness in the first area within the captured image and brightness in the second area within the pattern.

8. The information processing apparatus according to claim 1, wherein the shape information indicates a distance to the measurement target object.

9. The information processing apparatus according to claim 1, wherein the shape information includes information indicative of normals of planes of the measurement target object.

10. The information processing apparatus according to claim 1, wherein
the pattern further includes identification information for identifying the first features, and
the initial value acquisition unit associates the first features included in the projected pattern and the first features included in the captured image based on the identification information included in the captured image to identify the first features included in the captured image.

11. The information processing apparatus according to claim 10, wherein
the first features are lines,
the identification information is arranged on or between the lines, and
the second feature is arranged between the lines.

12. The information processing apparatus according to claim 11, wherein the identification information included in the pattern constitutes cuts in the lines included in the pattern.

13. The information processing apparatus according to claim 1, wherein the second feature included in the pattern constitutes dots.

14. The information processing apparatus according to claim 1, further comprising:
a projection unit that projects the pattern onto the measurement target object; and
an imaging unit that captures an image of the measurement target object onto which the pattern is projected.

15. An information processing method comprising:
- an acquisition step of acquiring an image captured by an imaging apparatus while a pattern including a plurality of first features and a second feature different from the first features is projected onto a measurement target object;
- an initial value acquisition step of associating the first features included in the projected pattern and the first features included in a captured image based on the captured image to identify the first features included in the captured image, and acquiring an initial value of shape information on the measurement target object in an area including the first features within the captured image based on an identified result;
- a setting step of setting a candidate for the shape information in a first area based on an initial value of shape information in an area surrounding the first area within the captured image;
- an evaluation step of deciding an area in the pattern corresponding to the first area as a second area based on the candidate for the shape information in the first area, and evaluating a correlation between the first area and the second area based on the second feature included in the first area and the second feature included in the second area; and
- a derivation step of deriving the shape information in the first area based on the correlation evaluated by the evaluation step.

16. A non-transitory storage medium storing a program that, when executed by a computer, causes the computer to:
- acquire an image captured by an imaging apparatus while a pattern including a plurality of first features and a second feature different from the first features is projected onto a measurement target object;
- associate the first features included in the projected pattern and the first features included in a captured image based on the captured image to identify the first features included in the captured image, and acquire an initial value of shape information on the measurement target object in an area including the first features within the captured image based on an identified result;
- set a candidate for the shape information in a first area based on an initial value of shape information in an area surrounding the first area within the captured image;
- decide an area in the pattern corresponding to the first area as a second area based on the candidate for the shape information in the first area, and evaluate a correlation between the first area and the second area based on the second feature included in the first area and the second feature included in the second area; and
- derive the shape information in the first area based on the evaluated correlation.

* * * * *